Figure 1A:
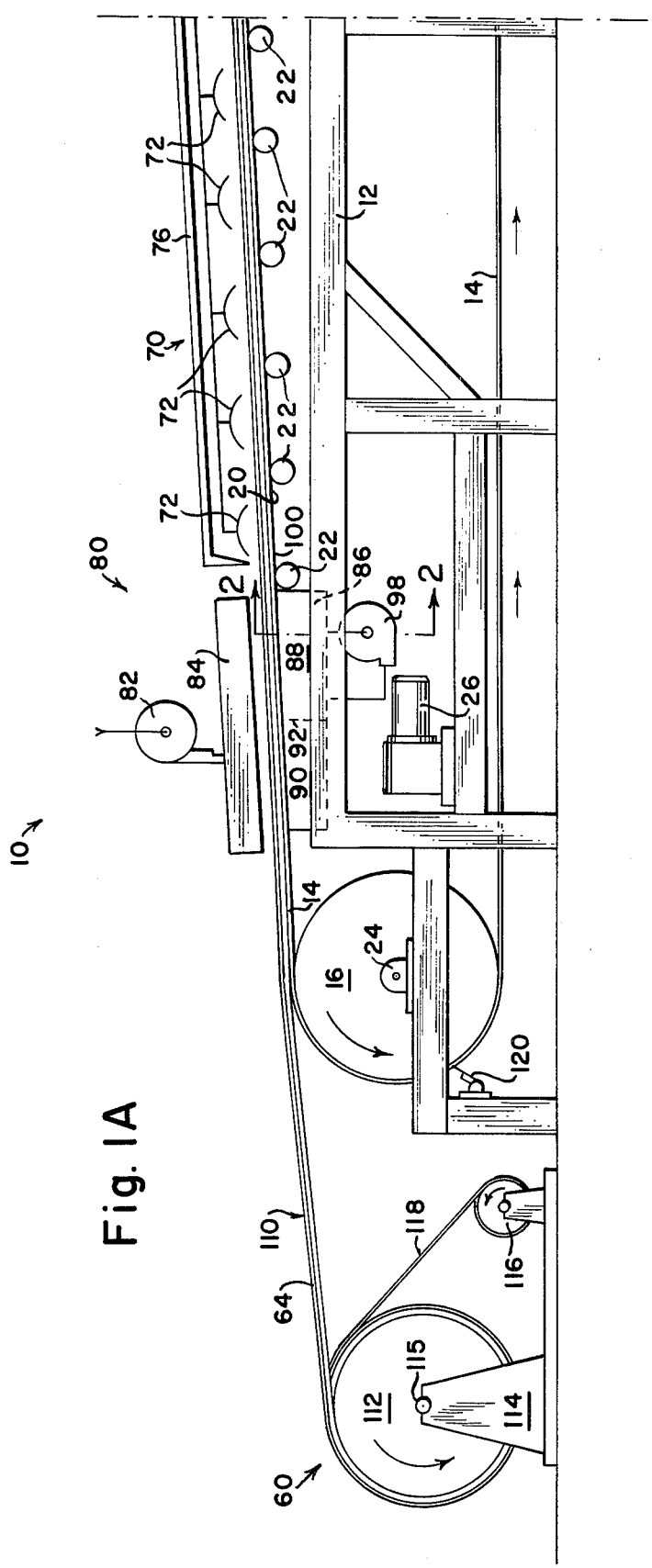

United States Patent [19]
Kinlock et al.

[11] 3,876,485
[45] Apr. 8, 1975

[54] METHOD AND APPARATUS OF PRODUCING PLASTIC COATED FABRIC CONVEYOR BELTING

[75] Inventors: Robert E. Kinlock, Huntington Beach, Calif.; Richard B. Hill, Paterson, N.J.

[73] Assignee: Sandvik Conveyor, Inc., Fair Lawn, N.J.

[22] Filed: Jan. 18, 1972

[21] Appl. No.: 218,681

[52] U.S. Cl. ................ 156/246; 156/247; 156/272; 156/289; 156/501; 264/212; 264/213
[51] Int. Cl. ........................................... B29c 15/00
[58] Field of Search .......... 156/244, 246, 247, 272, 156/289, 498, 499, 500, 501, 242; 264/176 R:212, 213

[56] References Cited
UNITED STATES PATENTS

| | | | |
|---|---|---|---|
| 2,511,703 | 6/1950 | Ettl | 156/498 |
| 3,330,713 | 7/1967 | Watson et al. | 156/247 |
| 3,518,148 | 6/1970 | Jacobson | 156/246 |
| 3,630,802 | 12/1971 | Dettling | 156/500 |
| 3,737,509 | 6/1973 | Kobayashi et al. | 264/212 |

*Primary Examiner*—Charles E. Van Horn
*Assistant Examiner*—Caleb Weston
*Attorney, Agent, or Firm*—Curtis, Morris & Safford

[57] ABSTRACT

A method and apparatus is disclosed for manufacturing reinforced urethane belting wherein liquid polyurethane is deposited at one end of a generally convex arcuate flight portion of an endless conveyor. A continuous sheet of fabric is applied to the upper surface of the polyurethane on the conveyor and is passed with the polyurethane and conveyor between a pair of closely spaced rollers to distribute the polyurethane in an even thickness between the fabric and the conveyor. Thereafter, the fabric and polyurethane are heated as they advance with the conveyor along the arcuate flight to cure the polyurethane and form an integral laminated belting. At the end of the arcuate conveyor flight the belting and conveyor are cooled and the laminated belting is tangentially removed from the conveyor.

13 Claims, 3 Drawing Figures

METHOD AND APPARATUS OF PRODUCING PLASTIC COATED FABRIC CONVEYOR BELTING

The present invention relates to the continuous manufacture of polyurethane reinforced belting material and in particular to the continuous manufacture of polyurethane reinforced belting material adapted for use as a conveyor belt.

Reinforced polyurethane belting has been previously manufactured by a number of methods. One such method has been to cast the polyurethane belting between a pair of flat horizontal conveyor belts or between a pair of vertically moving parallel conveyor belts. Neither of such proposed methods has been found entirely satisfactory in use since it is difficult to maintain a uniform thickness of the polyurethane. With horizontally-disposed conveyor belts, the belts tend to sag between their ends so that the liquid polyurethane is inadequately supported during the curing process. As a result, the thickness of the belting is not uniform. On the other hand, with vertically arranged conveyor belts it is difficult to maintain uniform thickness because of the effect of gravity drawing the liquid polyurethane down between the two conveyor belts.

Accordingly, it is an object of the present invention to form reinforced polyurethane belting material having a uniform thickness across its entire cross-section.

Another object of the present invention is to manufacture reinforced polyurethane belting with the use of a single supporting conveyor in a relatively rapid and economical process.

Another object of the present invention is to provide an apparatus for manufacturing reinforced polyurethane belting which is of relatively simple construction and operation, and which is relatively inexpensive to manufacture.

In accordance with an aspect of the present invention a method and apparatus for manufacturing reinforced polyurethane belting of uniform thickness is provided wherein an endless conveyor is mounted on a frame and has one flight portion thereof positioned for movement in a generally arcuate convex path of travel. Liquid polyurethane is applied to one end of the conveyor at the beginning of its path of travel along the arcuate flight and a continuous sheet of fabric is supplied to the upper surface of the polyurethane after it is deposited on the conveyor. A pair of closely spaced rollers are positioned respectively on either side of the arcuate flight at the point of application of the fabric to the polyurethane in order to evenly distribute the polyurethane between the fabric and the conveyor. As the polyurethane and fabric pass from the rollers and advance along the remaining portions of the arcuate conveyor flight, infrared radiant heat is applied thereto in order to cure the polyurethane and form an integral laminated belting with the fabric. At the end of the arcuate flight the belting and conveyor are cooled by a cooling system which supplies air at ambient temperatures to the belting and which sprays water on the lower surface of the conveyor. After the cooling station, the belting is removed from the conveyor along a path which is substantially tangential to the arcuate flight of the conveyor. The belt removing means and the spaced rollers cooperate to hold the polyurethane between the sheet and the conveyor as the belting is moved along the arcuate conveyor path during the curing process.

Figure 2:
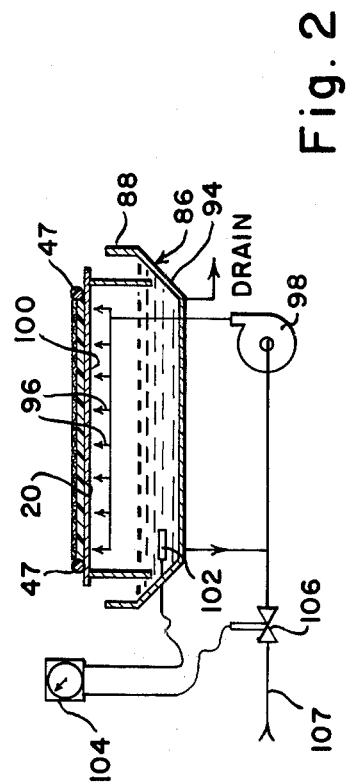
Figure 1B:
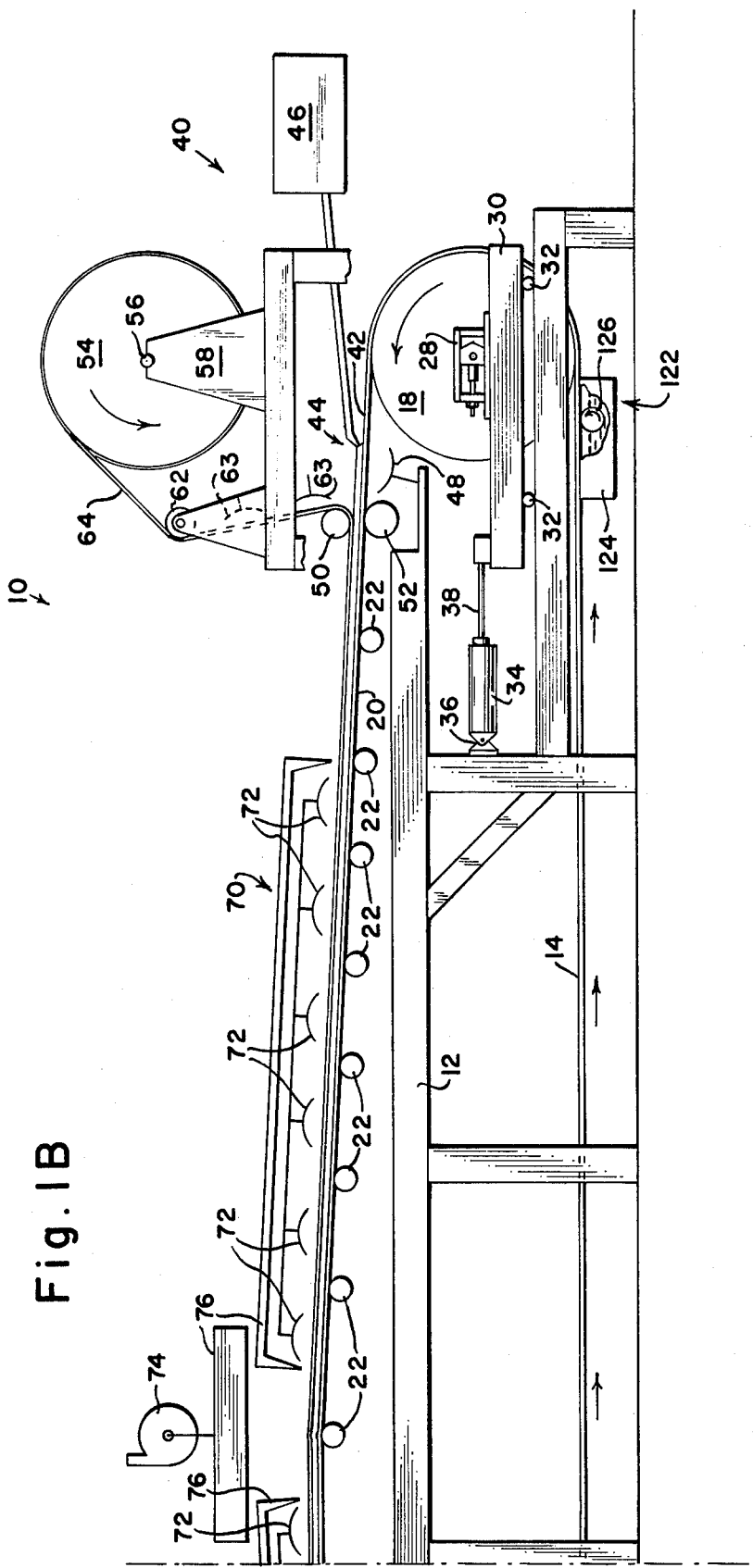

The above, and other objects, features and advantages of this invention, will be apparent in the following detailed description of an illustrative embodiment thereof which is to be read in connection with the accompanying drawings, wherein:

FIGS. 1A and 1B together, are a schematic elevational view of an apparatus constructed in accordance with the present invention for fabricating reinforced polyurethane belting; and FIG. 2 is a sectional view taken on line 2—2 of FIG. 1.

Referring to the drawings in detail, and initially to FIG. 1 thereof, it will be seen that a reinforced polyurethane belting manufacturing apparatus 10, embodying the present invention, as shown therein, includes a frame 12 on which an endless conveyor 14 is mounted for movement about a pair of end rollers 16 and 18 respectively. The upper flight 20 of conveyor 14 is supported on a plurality of rollers 22, mounted in crown fashion to define a generally arcuate convex upper flight portion for the conveyor upon which a substantial portion of the belt forming process of the present invention is performed.

Conveyor 14, in the preferred embodiment of the present invention, is formed of stainless steel to provide a finely finished substantially flat surface along its entire extent. The conveyor is driven by its engagement with roller 16 which is a generally cylindrical member formed of mild steel and mounted in bearing blocks 24 on frame 12. Roller 16 is driven by an electric motor 26, through a conventional chain and sprocket arrangement (not shown). The other end of conveyor belt 14 loops about roller 18, which also has a flat cylindrical surface, formed of mild steel, and which is rotatably mounted in two conventional adjustable tension take-up units 28. The latter are in turn mounted on a frame 30 which is slidably mounted by rollers 32 or the like on frame 12. A pair of pneumatic cylinders 34 (only one of which is seen in the drawings) have their cylinder portions pivotally mounted on frame 12 at 36 and the free end of their piston rods 38 secured to the frame 30 so that the position of roller 18 may be adjusted laterally with respect to roller 16 whereby the tension on the stainless steel conveyor belt 14 may be adjusted.

The belt forming process begins at the feeding station 40, adjacent the right end of arcuate conveyor flight 20. As the conveyor 14 moves about roller 18, liquid polyurethane is applied to substantially the entire width of its upper surface 42 at station 44 through a supply system 46 of conventional construction. The conveyor, it is noted, is provided with a pair of ropes 47 (FIG. 2) formed of silicon or like material to provide side dams on the belt for preventing overflow of the liquid polyurethane therefrom.

An infrared preheater unit 48 is mounted on frame 12 below flight 20 at station 44. This heater serves to preheat conveyor 14 and to maintain the liquid polyurethane in its liquid state prior to the next step in the process. After the conveyor, with the liquid polyurethane thereon, passes heater 48, it approaches a pair of closely-spaced rollers 50, 52. These rollers are also formed of stainless steel and have highly accurately finished flat cylindrical surfaces which are coated with a non-stick substance such as TEFLON so that any polyurethane that inadvertently comes into contact therewith does not adhere thereto.

A fabric or reinforcement carcass material supply roll 54 is mounted on frame 12 above station 44 to provide a continuous supply of reinforcing fabric material to the conveyor. This material, in the preferred embodiment of the invention, is formed of cotton batting of conventional construction. Roll shaft 56 of fabric roll 54 is seated in bearing supports 58 on frame 12 and a conventional edge guide control system (not shown) provides transverse movement of the roll on the bearings in support 58 so that the carcass roll may be accurately positioned with respect to the conveyor 14 for accurate feeding of the fabric material to the conveyor belt. A manually-controlled pneumatic brake system (not shown) is connected to the carcass roll shaft 56 in order to insure proper tension on the fabric as it is withdrawn from the roll. Alternatively, it is contemplated that the pneumatic brake system could be a preset automatic continuous tensioning device so that a constant tension is maintained in order to avoid possible stretching of lighter weight carcass material. In either case, the fabric is drawn from the roll 54 by a belting take-up system 60 at the opposite end of conveyor 14, adjacent pulley 16, which system is more fully described hereinafter.

A break roll 62 is positioned immediately adjacent supply roll 54 and the sheet of fabric 64 withdrawn from the roll passes over the outer surface of roll 62 to the upper roll 50. In this manner, the brake roll maintains a constant angle of carcass feed to the roll 50 whereby the carcass is uniformly supplied to the roll at all stages of the operation. In addition, infrared heaters 63 are mounted between rolls 62 and 59 to preheat and dry the carcass fabric prior to its application to the polyurethane.

As the liquid polyurethane is advanced into the purchase formed between rolls 50 and 52, it is engaged by the fabric sheet 64 passing over the roll 50 and thus is sandwiched between the fabric sheet 64 and the upper surface 42 of conveyor 14. The purchase between the rolls 50 and 52 is adjustable, by a conventional adjustment system (not shown) so that the thickness of the laminated belting can be selected and adjusted as desired. As the combination of fabric and liquid polyurethane passes through the purchase between rolls 50 and 52, the polyurethane is evenly distributed across the width of the conveyor 14 between ropes 47 to provide a flat uniform thickness of the polyurethane on the conveyor surface.

After the combined polyurethane and fabric pass from rolls 50, 52 it passes, with conveyor 14, along the arcuate flight portion 20 of the conveyor. It is noted that the laminated belting is drawn through apparatus 10 at the same speed of movement as the conveyor 14 so that there is no relative movement between the polyurethane and either the fabric or the conveyor.

A heating station 70 is located above the arcuate portion of the conveyor flight 20. In the preferred embodiment of the invention this heating section is 40 feet long and is composed of a plurality of gas fired infrared burners 72 evenly spaced along the conveyor flight. The infrared burners 72 provide efficient high-intensity heat to the fabric and polyurethane on the conveyor belt 14 in order to cure and set the polyurethane to form a laminated reinforced belting material. The products of combustion exhausted from the infrared burners, which are of conventional construction and need not be described herein in detail, are discharged from the apparatus by a blower 74 and exhaust hood assembly 76 located at the top of the crown formed by the rollers 22.

While the burners 72 are all shown as being located above the conveyor, it is contemplated that one or more burners may be placed below the stainless steel belt so as to heat the belting from both sides. This arrangement would be primarily useful where a very thick polyurethane coating is used.

By the time the conveyor 14 has transported the polyurethane and fabric to the end of curing and heating station 70, the curing cycle is substantially completed and the product and conveyor pass into a two-stage cooling station 8. At this station, a blower 82 supplies cooling air at ambient temperatures to the upper surface of the fabric and polyurethane belting through a slotted hood 84.

A water tank 86 is located immediately below conveyor 14 and air hood 84 and is separated into two cooling zones 88 and 90 by a wall 92 which completely isolates the two zones. The first heating zone 88, as seen in FIG. 2, has a supply of water in its base 94. The water is sprayed through nozzles 96 by a centrifugal pump 98 which circulates the water in the tank against the lower surface 100 of conveyor 14 to cool the conveyor and the belting formed thereon. A temperature sensor 102 provides an input to a reverse acting pneumatic indicating controller 104, of conventional construction, which activates a flow control valve 106 on a water supply line 107 to insure that the water temperature in the tank section 94 is maintained within the range of 75°–180°F. In other words, in the event that the temperature within the section 94 is raised above 180°F, the valve 106 is opened by control 104 to permit water at ambient temperature from water supply main 107 to flow into the tank until the temperature of the water therein is reduced below the required temperature. This provides a first stage cooling effect for the conveyor and product thereon without placing an extreme cooling shock on either the conveyor or the fabric. As the conveyor passes over cooling zone 90, it is sprayed from below with single pass well water supplied at ambient temperature and pumped through a plurality of nozzles to cool the lower surface of the conveyor and thereby further reduce the temperature of the belt and product thereon.

After conveyor belt 14 passes through station 90, its temperature has been substantially reduced and it is removed from the conveyor 14 by the belting take-up or wind-up apparatus 60. As seen in FIG. 1, the completed belting 110 is removed from conveyor belt 14 along a line which is substantially tangential to the conveyor belt and in a direction below the level thereof. In this manner, fabric sheet 64 is held under tension between roller 50 and roller 16 across the crown of belt 14 so that the fabric sheet presses against the polyurethane and the belt 14. Belt 14 is held flat against the rollers 22 because of the crown mounting thereof, so that a smooth uniform surface is provided on the cured polyurethane during the manufacturing process. Wind-up system 60 includes a cylindrical wind-up roll 112, preferably constructed of heavy-plate steel, mounted for rotation in bearing blocks 114. An edge guide control system of conventional construction provides transverse movement of the roll 112 on its bearing so that the finished carcass can be accurately positioned and wound on the roll. A manual or automatically controlled pneumatic operated brake (not shown) similar to that used for roll 54, is connected to the carcass wind-up roll shaft 115 in order to insure proper tension on the carcass so that the carcass is tightly wound thereon without backlash or looseness. This braking system is similar to the braking system utilized on supply roll 54 at station 40, and is of conventional construction forming no part of the present invention so that it need not be described fully herein in detail.

A supply roll 116 having paper wound therein is mounted adjacent roll 112. The paper thereon is in the form of a continuous sheet 118 and is positioned between the layers of carcass 110 as it is wound on roll 112. As a result, the paper forms a liner between the layers of urethane-coated carcass to eliminate fiber identification marks which might be impressed upon urethane coating engaged with the fabric backing of the next adjacent layer. The paper liner roll 116 may also be provided with a brake tensioning device to maintain the tension on the paper as it is withdrawn from the roll by the actuation of winding roll 112.

Once the product has been taken off belt 14, the belt loops about roll 16 and is cleaned by a doctor knife 120 which engages the conveyor belt to scrape any residual polyurethane or other material which may be on the conveyor prior to the next application of polyurethane thereto. The doctor knife is slidably mounted for movement laterally of the belt and is provided with an edge guide control of conventional construction. In this manner the knife tracks with the edge of the stainless steel belt and is maintained between the ropes 47 so that these ropes are not damaged.

From the doctor knife 120, conveyor 14 passes along its lower flight to a coating station 122 wherein the conveyor is coated with a release coating of silicon or the like on the carrying side of the belt in order to promote release of the polyurethane from the belt when the process is completed.

Coating station 122 includes a tank 124 in which liquid silicon is maintained and a buff roll 126 rotatably mounted in the tank for engagement with the belt. Roll 126 is driven in an opposite direction from the path of travel of the conveyor 14 so that a positive contact is made therebetween for the uniform application of silicon of the conveyor. The conveyor belt is now prepared for the application of polyurethane thereto, and as the belt loops about roll 18, it approaches station 44 wherein liquid polyurethane is again applied thereto. It is noted that the operation of the present invention is a continuous operation so that no stopping or starting of the process is required and the process is substantially automatic.

It is thus seen that a relatively simple and inexpensive method and apparatus has been provided for fabricating reinforced polyurethane belting material of uniform thickness. The process of the present invention is performed by the apparatus in a rapid continuous manner and avoids the problems of the prior art wherein belt sagging and gravity effects cause non-uniform thicknesses in polyurethane belts.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. The method of manufacturing reinforced polyurethane belting which comprises the steps of, continuously advancing an endless conveyor along a generally horizontal and upwardly convex arcuate flight, depositing a continuous layer of liquid polyurethane on one end of said conveyor in a depositing zone at the beginning of the conveyor path of travel along said arcuate flight, applying a continuous sheet of fabric onto said layer of polyurethane on the upper surface of said conveyor adjacent said one end of the conveyor depositing zone and passing said sheet of fabric and layer of polyurethane and said conveyor between a pair of closely spaced rollers adjacent the zone at which said sheet of fabric is applied while advancing said conveyor along said arcuate flight, thereafter heating said layer of polyurethane and sheet of fabric as they advance with the conveyor along said arcuate flight to cure said polyurethane and form an integral laminated belting, cooling said belting and conveyor at the end of said arcuate flight by spraying the underside of the conveyor at the end of the arcuate flight first with water having a controlled temperature within a predetermined range and thereafter spraying the underside of the conveyor with water at a lower relatively stable temperature, and thereafter removing said belting from said conveyor along a path substantially tangential to said arcuate flight, whereby the tension on said sheet of fabric holds it tightly against the polyurethane and the polyurethane is held tightly and uniformly between the sheet and the conveyor as it is moved along the arcuate flight of the conveyor.

2. The method as defined in claim 1 including the step of continuously applying a release coating to the surface of said conveyor prior to the depositing of said polyurethane thereon.

3. The method as defined in claim 1 including the step of winding said belting into a roll as it is removed from said conveyor and continuously supplying a paper liner to the outer surface of the roll as the belting is wound thereon to separate and protect the belting layers on said roll.

4. The method as defined in claim 1 wherein said heating step comprises producing infrared radiant heat and directing said radiant heat to said polyurethane and fabric sheet.

5. The method as defined in claim 1 wherein said step of applying a fabric sheet to the polyurethane includes the step of continuously supplying fabric sheet material to the surface of the polyurethane continuously deposited on said conveyor immediately prior to passage thereof through the purchase between said rollers.

6. The method as defined in claim 5 including the steps of preheating said conveyor and deposited polyurethane prior to passage between said rollers and preheating said fabric prior to application thereof to said polyurethane to remove excess moisture therefrom.

7. The method of manufacturing reinforced polyurethane belting which comprises the steps of, continuously advancing an endless conveyor along a generally convex arcuate flight, continuously depositing liquid polyurethane on one end of said conveyor at the beginning of its path of travel along said arcuate flight, applying a sheet of fabric to the polyurethane on the upper surface of said conveyor adjacent said one end of the conveyor and passing said sheet, polyurethane and conveyor between a pair of closely spaced rollers adjacent said one end of the conveyor while advancing said conveyor along said arcuate flight, thereafter heating said polyurethane and fabric sheet as they advance with said conveyor along said arcuate flight to cure said polyurethane and form an integral laminated belting, cooling said belting and conveyor at the end of said arcuate flight by the steps of spraying the underside of said conveyor at the end of said arcuate flight with water having a controlled temperature of between 75° to 180°F and thereafter spraying said underside of said conveyor with single pass water, at substantially ambient temperature, and removing said belting from said conveyor along a path substantially tangential to said arcuate flight whereby said fabric sheet is held tightly against the polyurethane and the polyurethane is held tightly and uniformly between the sheet and the conveyor as it is moved along the arcuate flight of the conveyor.

8. The method as defined in claim 7 including the step of simultaneously supplying air at ambient temperature to the fabric and polyurethane at the end of said arcuate flight.

9. The method of continuously forming reinforced polyurethane belting which comprises the steps of, continuously advancing an endless conveyor along a generally arcuate convex flight, depositing liquid polyurethane on one end of said conveyor at the beginning of its path of travel along said flight, supplying a substantially continuous sheet of fabric to the surface of said polyurethane while passing said fabric, polyurethane, and conveyor between a pair of closely spaced rollers to distribute said polyurethane in an even thickness between said fabric and said conveyor, preheating said conveyor and deposited polyurethane prior to passage between said rollers and preheating said fabric prior to application thereof to said polyurethane to remove excess moisture therefrom, thereafter heating said polyurethane and fabric sheet by directing infrared radiant heat thereto as they advance within said conveyor along said arcuate flight to cure said polyurethane and form an integral laminated belting, cooling said belting and conveyor at the end of said arcuate flight by spraying the underside of said conveyor adjacent the end of said arcuate flight with water having a controlled temperature of between 75°F to 180°F and thereafter spraying said underside of said conveyor with single pass water at substantially ambient temperature, and removing said belting from said conveyor along a path substantially tangential to said arcuate flight whereby said fabric sheet is held tightly against the polyurethane and the polyurethane is held tightly and uniformly between the sheet and the conveyor as it is moved along the arcuate flight of the conveyor.

10. The method as defined in claim 9 including the step of simultaneously supplying air at ambient temperature to the fabric and polyurethane at the end of said arcuate flight.

11. The method as defined in claim 10 including the step of continuously applying a release coating to the surface of said conveyor prior to the depositing of said polyurethane thereon.

12. The method as defined in claim 11 including the step of winding said belting into a roll as it is removed from said conveyor and continuously supplying a paper liner to the outer surface of the roll as the belting is wound thereon to separate and protect the belting layers on said roll.

13. The method of manufacturing reinforced polyurethane belting which comprises the steps of, continuously advancing an endless conveyor along an upwardly-convex flight path which is generally horizontal and is upwardly-convex throughout the entire length of the forming zone in which the belting forming materials are brought together and the polyurethane is cured, depositing a continuous layer of liquid polyurethane on said conveyor in a depositing zone at the beginning of the conveyor path of travel into said forming zone, passing said layer of polyurethane beneath a roller which is positioned a predetermined distance from said belt in the path of movement of said layer and belt away from said depositing zone and simultaneously applying a continuous sheet of carcass against the top surface of said layer as it moves under said roller and into the nip between said roller and said belt, thereafter heating said layer of polyurethane as it advances with the conveyor through said forming zone to cure said polyurethane and form an integral laminated belting, cooling said belting as it moves from said forming zone by spraying the underside of the conveyor first with water having a controlled temperature within a predetermined range and thereafter spraying the underside of the conveyor with water at a lower relatively stable temperature, and thereafter removing said belting from said conveyor at a removal zone along a path downwardly relative to said upwardly-convex flight path so that said carcass is held under tension between said nip and said removal zone, whereby the tension on said sheet of carcass holds said sheet tightly against the polyurethane and the polyurethane is held tightly and uniformly between the sheet and the conveyor as it is moved through said forming zone thereby to insure that said sheet is properly positioned against the polyurethane and the polyurethane is formed and cured into a sheet having uniform thickness longitudinally thereof.

* * * * *

UNITED STATES PATENT AND TRADEMARK OFFICE
CERTIFICATE OF CORRECTION

PATENT NO. : 3,876,485
DATED : April 8, 1975
INVENTOR(S) : Robert E. Kinlock and Richard B. Hill It is certified that error appears in the above-identified patent and that said Letters Patent are hereby corrected as shown below:

In the heading, the name and address of the Assignee is changed from "Sandvik Conveyor, Inc., Fair Lawn, N.J." to --Sandco Limited, Ottawa, Canada--.

Signed and Sealed this twenty-first Day of October 1975

[SEAL]

Attest:

RUTH C. MASON
*Attesting Officer*

C. MARSHALL DANN
*Commissioner of Patents and Trademarks*